(12) United States Patent
Wlassich

(10) Patent No.: US 10,508,421 B2
(45) Date of Patent: Dec. 17, 2019

(54) WATER RECLAMATION SYSTEMS AND METHODS

(71) Applicant: Rain Bird Corporation, Azusa, CA (US)

(72) Inventor: John James Wlassich, Pasadena, CA (US)

(73) Assignee: Rain Bird Corporation, Azusa, CA (US)

( * ) Notice: Subject to any disclaimer, the term of this patent is extended or adjusted under 35 U.S.C. 154(b) by 146 days.

(21) Appl. No.: 15/721,403

(22) Filed: Sep. 29, 2017

(65) Prior Publication Data

US 2019/0100902 A1 Apr. 4, 2019

(51) Int. Cl.
*E03B 3/28* (2006.01)
*F25B 21/02* (2006.01)
*B01D 53/04* (2006.01)
*B01D 53/26* (2006.01)
*B01D 53/28* (2006.01)

(52) U.S. Cl.
CPC ............ *E03B 3/28* (2013.01); *B01D 53/0438* (2013.01); *B01D 53/261* (2013.01); *B01D 53/265* (2013.01); *B01D 53/28* (2013.01); *F25B 21/02* (2013.01); *B01D 2253/204* (2013.01); *B01D 2257/80* (2013.01); *B01D 2259/40083* (2013.01); *B01D 2259/416* (2013.01); *B01D 2259/4508* (2013.01); *F25B 2321/021* (2013.01)

(58) Field of Classification Search
CPC ............ B01D 53/0407; B01D 53/0438; B01D 53/0454; B01D 53/0446; B01D 5/0042; B01D 5/009; B01D 2253/204; B01D 2257/80; E03B 3/28; F25B 21/02
USPC .................................................. 62/3.4
See application file for complete search history.

(56) References Cited

U.S. PATENT DOCUMENTS

| | | | |
|---|---|---|---|
| 5,149,446 A * | 9/1992 | Reidy | B01D 5/0039 210/744 |
| 6,116,034 A * | 9/2000 | Alexeev | B01D 5/0003 62/92 |
| 6,378,311 B1 * | 4/2002 | McCordic | F24F 3/14 62/3.4 |
| 7,043,934 B2 | 5/2006 | Radermacher et al. | |
| 9,617,719 B2 | 4/2017 | Sawyer et al. | |
| 2004/0000165 A1* | 1/2004 | Max | B01D 5/0042 62/615 |

(Continued)

OTHER PUBLICATIONS

Wahlgren, Roland V., "Atmospheric Water Vapour Processor Designs for Potable Water Production: A Review," Water Research, 2001, vol. 35, Issue 1, pp. 1-22.

(Continued)

*Primary Examiner* — Tho V Duong
(74) *Attorney, Agent, or Firm* — Fitch, Even, Tabin & Flannery, LLP (57) ABSTRACT

A system for reclaiming water from moisture-laden building exhaust exiting a building through a vent is described herein, where the system can include one or more porous metal organic frameworks (MOFs) disposed downstream of the building exhaust vent for adsorbing water from the exiting moisture-laden building exhaust. The adsorbed water can be desorbed from the MOF, either naturally or aided by cooling the MOF. The desorbed water can optionally be collected or directed elsewhere for use or collection.

15 Claims, 6 Drawing Sheets

(56) References Cited

U.S. PATENT DOCUMENTS

| | | | | |
|---|---|---|---|---|
| 2005/0189209 A1* | 9/2005 | Craven | ............... | B01D 3/346 |
| | | | | 203/10 |
| 2012/0204725 A1* | 8/2012 | Goelet | ................ | B01D 5/00 |
| | | | | 96/143 |
| 2013/0098080 A1* | 4/2013 | Biancardi | ............. | E03B 3/28 |
| | | | | 62/93 |
| 2015/0353379 A1* | 12/2015 | Lee | ...................... | C02F 1/14 |
| | | | | 203/10 |
| 2016/0313747 A1* | 10/2016 | Meijer | ................ | G05D 22/02 |

OTHER PUBLICATIONS

Seo, You-Kyong, et al., "Energy-Efficient Dehumidification over Hierachically Porous Metal-Organic Frameworks as Advanced Water Adsorbents," Advanced Materials, 2012, vol. 24, pp. 806-810.

Furukawa, Hiroyasu, et al., "Water Adsorption in Porous Metal-Organic Frameworks and Related Materials," Journal of the American Chemical Society, 2014, vol. 136, No. 11, pp. 4369-4381.

Kim, Hyunho, et al., "Water harvesting from air with metal-organic frameworks powered by natural sunlight," Science, 2017, 10.1126/science.aam8743, 10 pages.

Chandler, David, "Water, water everywhere . . . even in the air," MIT News Office, Apr. 14, 2017, [online], [retrieved on Oct. 23, 2017]. Retrieved from the Internet: <URL: http://news.mit.edu/2017/MOF-device-harvests-fresh-water-from-air-0414>, 4 pages.

* cited by examiner

WATER RECLAMATION SYSTEMS AND METHODS

FIELD

Water reclamation systems and methods are described herein, including systems and methods using porous metal-organic frameworks.

BACKGROUND

Heating, ventilation and air conditioning systems for buildings typically are designed to vent air from within the building. The venting of air can allow for replacement air to be brought into the building. The vented air can contain moisture. The sources of moisture can include humidity present in the air, which can vary depending upon geographic region, as well as moisture generated within the building and added to the vented air. Moisture generated within the building can come from sources such as humans, humidifiers, or manufacturing processes.

Attempts have been made at reclaiming water from a building. One option has been to cool a surface below the dew point of the ambient air to encourage water condensation. For example, U.S. Pat. No. 9,617,719 discloses using a chiller to condense moisture from the exhaust of an air conditioning unit. Another option has been to concentrate water vapor through the use of solid or liquid desiccants. Yet another option has been to induce and control convection in a tower structure. Common problems of past attempts include excessive operating costs and lack of effectiveness when the ambient air has low humidity.

SUMMARY

A system for reclaiming water from moisture-laden building exhaust exiting a building through a vent is described herein, where the system can include one or more porous metal organic frameworks (MOFs) disposed downstream of the building exhaust vent for adsorbing water from the exiting moisture-laden building exhaust. The adsorbed water can be desorped from the MOF, either naturally or aided by cooling the MOF. The desorped water can optionally be collected or directed elsewhere for use or collection.

The one or more MOFs can each have an edge positioned for receiving the exiting moisture-laden building exhaust for purposes of adsorbing water from the exiting moisture-laden building exhaust via diffusion within the MOF. A cooler can lower the temperature of the MOF, such as when in abutment against a surface thereof, to facilitate desorption of water from within the MOF. The surface in contact or adjacent to the cooler can be different from the edge positioned for receiving the exiting moisture-laden building exhaust. Optionally, the surface can have a much greater surface area than the edge.

Optionally, the cooler can be a thermoelectric cooler. An optional heat flux sensor for monitoring condensation heat can be disposed within or adjacent to the MOF for purposes of adjusting the thermoelectric cooler.

Optionally, the thermoelectric cooler can be powered by solar power.

Optionally, a plenum can be disposed between the building exhaust vent and the MOF to help accommodate air flow changes without restricting air exiting the vent. Also optionally, the plenum can be configured to vary in volume in response to pressure changes within the plenum.

Optionally, the MOF can be configured for agitation, whether by applying agitation or by utilizing environmental vibrations.

Optionally, the system can be disposed on top of a building in order to act as a pressure head, and not requiring a pump.

A method of reclaiming water from moisture-laden building exhaust exiting a building through a vent is provided that includes adsorbing water within a porous MOF from the exiting moisture-laden building exhaust; desorping water from within the MOF by cooling at least a portion of the MOF; and optionally collecting water desorped from with the MOF.

DETAILED DESCRIPTION

Figure 1:
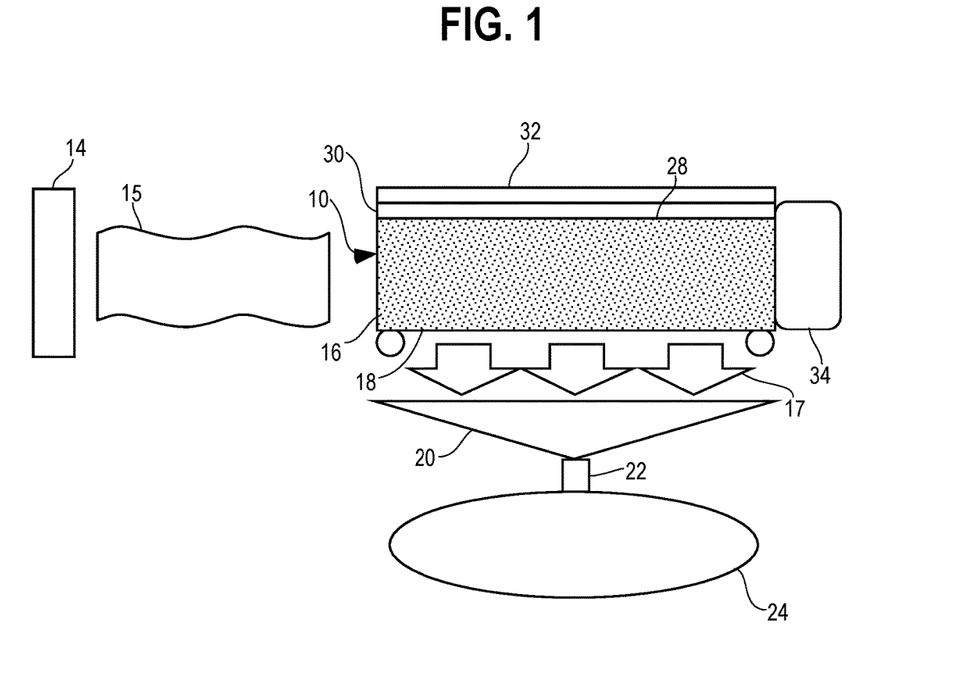
FIG. 1 is a schematic side elevation view of a first embodiment of a system for reclaiming water from the exhaust of a building vent, showing a MOF receiving the exhaust and water draining from a large surface of the MOF.
Figure 2:
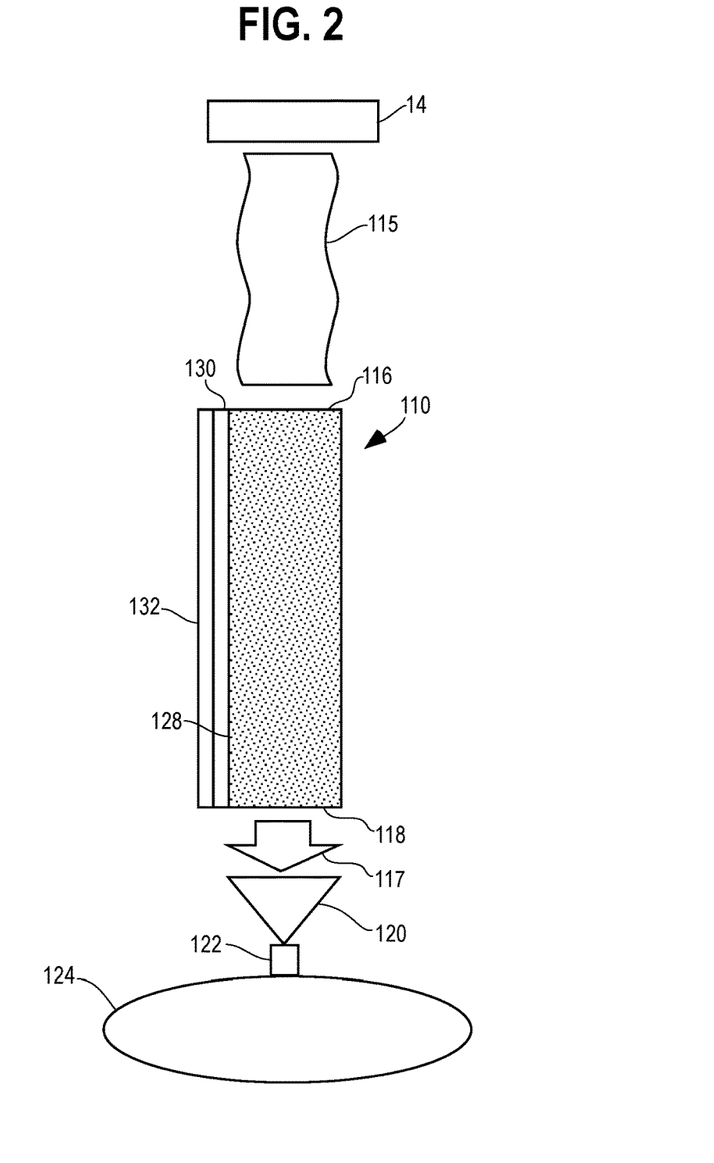
FIG. 2 is a schematic side elevation view of a second embodiment of a system for reclaiming water from the exhaust of a building vent, showing an MOF receiving the exhaust and water draining from a small surface or edge of the MOF.
Figure 3:
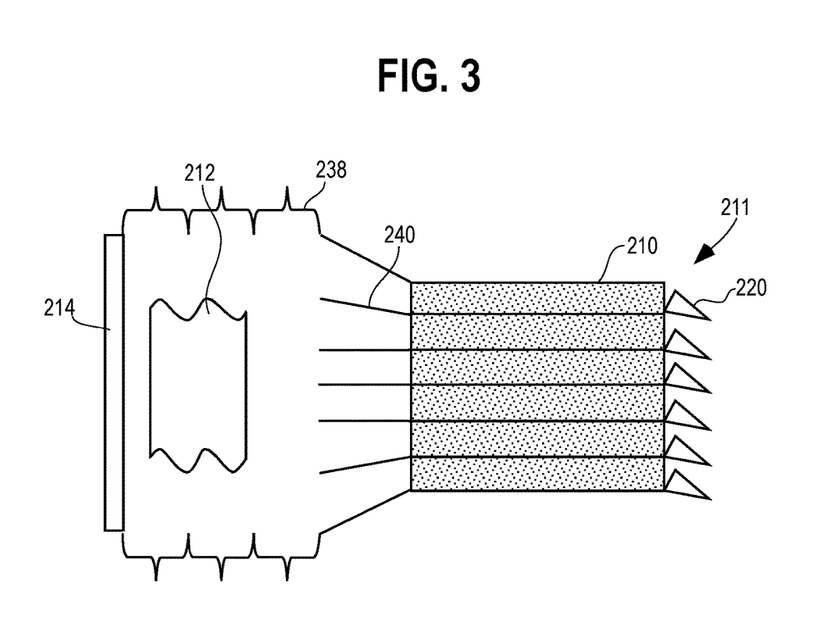
FIG. 3 is a schematic side elevation view of a second embodiment of a system for reclaiming water from the exhaust of a building vent, showing an array of MOFs.
Figure 4:
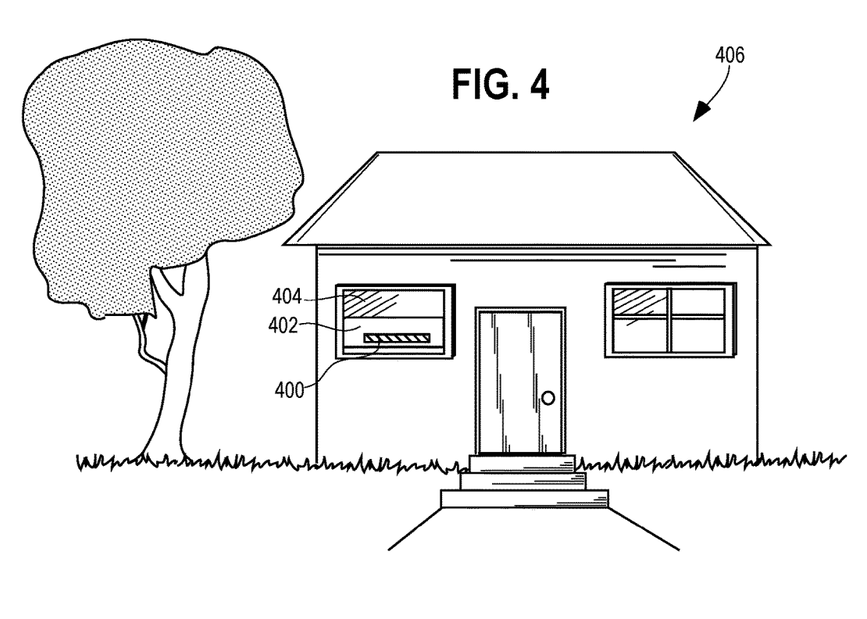
FIG. 4 is a schematic representation of an MOF incorporated into a window air conditioning unit installed in a house.
Figure 5A:
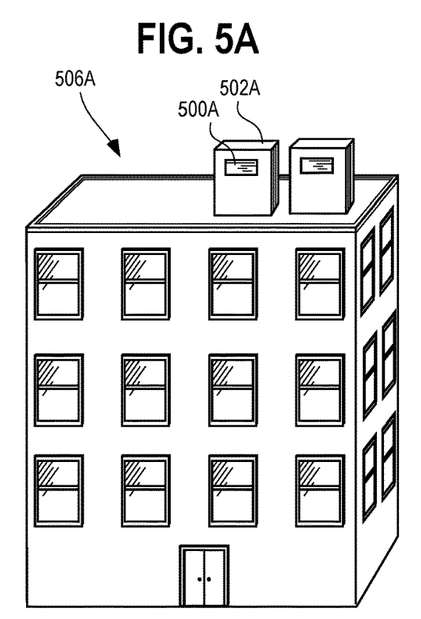
FIGS. 5A and 5B are schematic representations of MOFs incorporated into roof-top air conditioning units disposed on buildings.
Figure 5B:
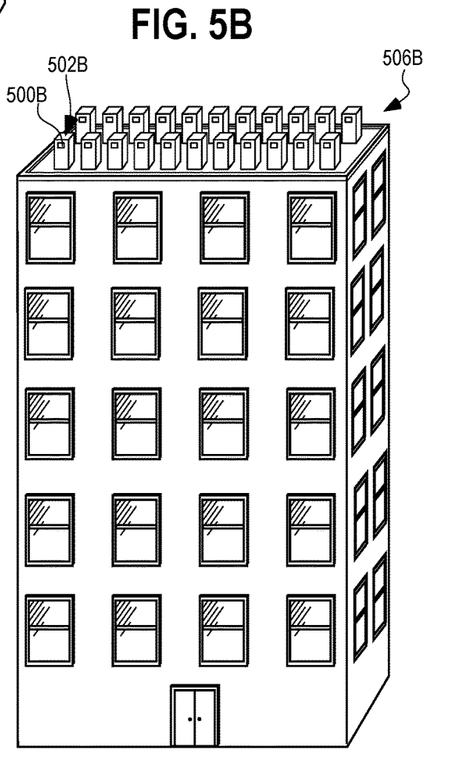
Figure 6:
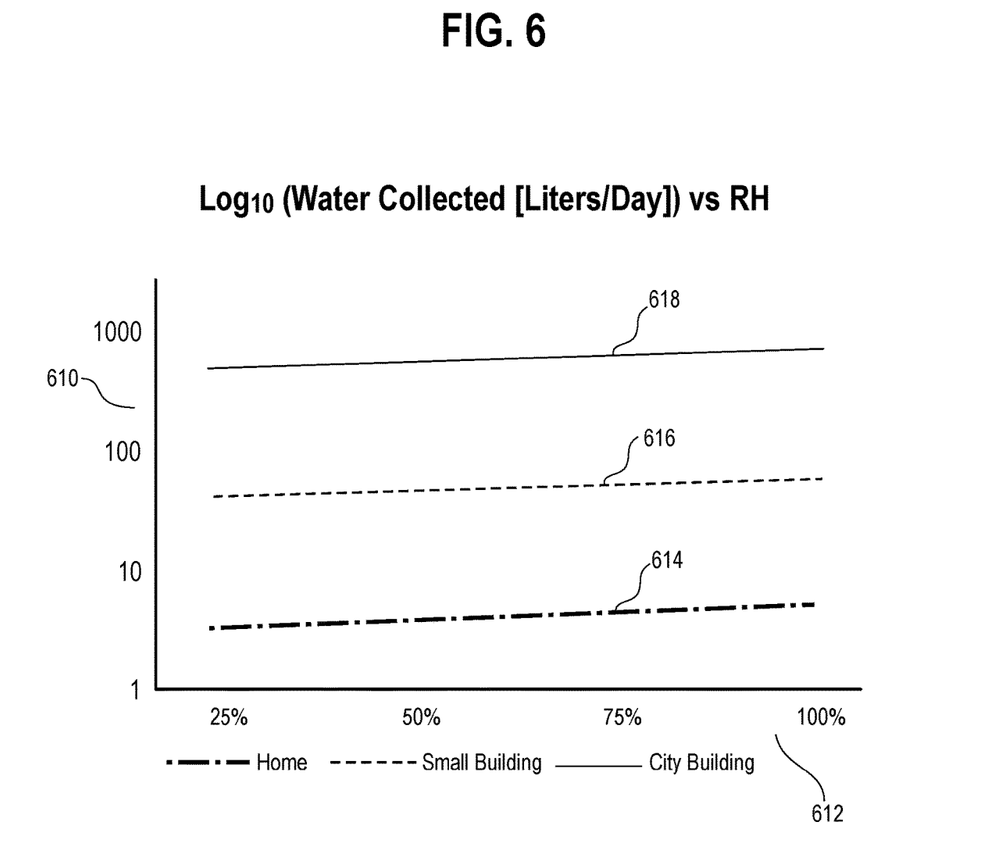
FIG. 6 is a graph showing examples of water harvested per day as a function of relative humidity.

Systems are described herein, and illustrated schematically in FIGS. 1-3, for reclaiming water from moisture-laden building exhaust exiting a building through a vent. System applications such as in a residence, a small building or a city building are shown in FIGS. 4, 5A and 5B. FIG. 6 is a graphical representation of water harvesting effectiveness of the system applications of FIGS. 4, 5A and 5B. The systems advantageously utilize the adsorption and desorption properties of porous metal-organic frameworks (MOFs) in to order to accumulate water from the ventilation air and then dispense the accumulated water. As described herein, adsorption and desorption capabilities of the MOFs can be enhanced for efficiently reclaiming water from the building exhaust.

The basic components of the system for reclaiming water from moisture-laden building exhaust exiting a building through a vent include (1) one or more MOFs disposed downstream of the building exhaust vent; (2) a cooler for facilitating desorption of water from with the MOF; and (3) a device for either collecting the reclaimed water or directing the retained water elsewhere.

The MOFs described herein can be formed of microcrystalline powder MOF-801 and have a porosity of approximately 85%. Instead of a MOF, a metal foam (MF) can be used in its place, including in the embodiments described herein. Typical adsorption and desorption rates for such materials can range between 2.5-3.5 L/kg/s. However, it can be advantageous to improve the natural desorption rate of the MOF by cooling one or more of the surfaces of the MOF, as described herein. For example, lowering a surface temperature from 65° C. to 25° C. can increase the cumulative natural desorption of the MOF from approximately 0.02 L/kg of water harvested to approximately 0.25 L/kg (though these values can depend on the relative humidity). The term MOF as used herein can refer to either a single piece of MOF or a grouping of MOFs, such as an array of MOFs.

The MOF can be provided immediately downstream of a vent of a building, as shown in FIGS. 1-3, for receiving exhaust air from the building. The exhaust air can be driven from the vent by a ventilation fan. The MOF is positioned such that some or all of the air from the vent contacts the MOF. The structure of the MOF facilitates adsorption of moisture from the passing air with the open pores of the MOF.

In one exemplary arrangement, depicted schematically in FIG. 1, the MOF is in the form of a horizontally-oriented rectangular slab 10, having a length and width much greater than its height. The MOF 10 is positioned such that air 15 from a vent 14 enters via an entrance edge 16 having an area defined by the width and the height of the MOF 10. Water is adsorbed from the exhaust air 15 within the MOF 10, while the air 15—with reduced moisture content—exits the MOF 10 in the direction of air flow 17. Water resulting from desorption can exit the MOF 10 under the influence of gravity via an exit surface 18 of the MOF 10. In this exemplary embodiment, the area of the exit surface 18 is much larger than the area of the entrance edge 16, which can reduce the velocity of the air flow entering the MOF and/r attenuate any pressure wave, such as coming from a manifold downstream of a building exhaust. Water can be collected in a drip pan 20 and then funneled via piping 22 into a collection vessel 24. Alternatively, the piping 22 can lead directly to a reuse of the water, such as for irrigation, instead of collection of the water. The collection vessel 24 can be a water tank, bladder, or other suitable structure.

In order to facilitate desorption of water from within the MOF 10, a thermoelectric chiller 30 can abut a surface 28 of the MOF, opposite the exit surface 18. The thermoelectric chiller 30 can be controlled using a heat flux sensor or temperature 32. For example, freezing or ice build-up should be avoided. As discussed above, cooling the MOF 10 can advantageously increase the rate of desorption and thus increase the rate of water exiting the MOF 10.

Another way to facilitate desorption of water from within the MOF 10 is to agitate the MOF 10. The agitation of the MOF 10 can be accomplished in several ways. One way to agitate the MOF 10 is to utilize a vibratory motor 34 abutting the MOF 10, as shown in FIG. 1. An alternative way to agitate the MOF 10 is to position the MOF 10 on rollers, wheels, bearings or the like so that environmental vibrations can be transmitted to the MOF 10. For example, variations in the pressure of the exhaust air 15 can be used to agitate the MOF 10, as can vibrations caused by ventilation fans or other sources.

In another exemplary arrangement, depicted schematically in FIG. 2, the MOF is in the form of a vertically-oriented rectangular slab 110, having a height and depth much greater than its thickness. The MOF 110 is positioned such that air 115 exiting downward from a vent 114 enters via an entrance edge 116 having an area defined by the depth and thickness of the MOF 110. Water is adsorbed from the exhaust air 115 within the MOF structure 110, while the air 115—with reduced moisture content—exits the MOF 10 in the direction of air flow 117. Water resulting from desorption can exit the MOF 110 under the influence of gravity via an exit surface 118 of the MOF 110. In this exemplary embodiment, the area of the exit surface 118 is the same as or about the same as the area of the entrance edge 116, which can provide a greater gravity assist for the water flow as compared to the prior embodiment discussed above. Water can be collected in a drip pan 120 and then funneled via piping 122 into a collection vessel 124 or for direct use. As with the embodiment of FIG. 1, a thermoelectric cooler 130 controlled by a heat flux sensor 132 can be positioned adjacent a surface 128 of the MOF 110 for facilitating desorption of water from within the MOF 110. Agitation can be provided for the MOF 110 as discussed above.

Yet another exemplary embodiment can include an array 211 of MOFs, as shown in FIG. 3. The array 211 can include individual MOFs 210 arranged as shown in FIG. 1. This embodiment, however, includes a plenum 238 downstream of a vent 214 and upstream of the array 211 of MOFs 210. The plenum 238 is configured to accommodate surges in air flow to allow for air 212 to exit the vent 214 in temporary excess of the amount of air 212 that can flow through the array 210. The plenum 238 can be flexible or otherwise configured to increase or decrease in size to further allow for accommodation of temporary increases in air flow without restricting or unduly restricting the flow of air through the vent 214. While no plenum 238 could be used, the use of a plenum 238 can help with capturing more of the moisture from the air 212 exiting the vent 214. A manifold 240 can be disposed between the plenum 238 and the array 211 of MOFs 210 in order to direct air flow to each of the MOFs 210. Indeed, the manifold 240 can be configured for facilitating relatively equal air flow through each of the MOFs 210 to improve the efficiency of the array 210. Each of the MOFs 210 can have a collecting funnel 220 for directing desorped water to a common piping 222.

Previous studies (e.g., H. Kim et al., Science, April 28; 356(633):430-434, 2017) have shown that a roughly 5 cm by 5 cm by 0.5 cm MOF layer (specifically, a MOF layer composed of MOF-801) of packing porosity approximately 0.85 sitting in ambient air can harvest an average of 0.3 L/day of water at 25% relative humidity. In this instance, the MOF layer undergoes mostly natural convection. The exact amount of water harvested can depend on a number of factors, such as air temperature, exhaust air velocity, relative humidity, amount of sunshine, MOF material, amount of MOF used in a system, chiller temperature (if present), any build-up of dirt and other debris within the MOF, and porosity.

For systems, such as those described above, the MOF layer (or MOF layer array) does not sit in stagnant air, rather it has ventilated air directly flowing onto it, resulting in forced turbulent convection. On average, a MOF layer exposed to forced turbulent convection is roughly 10 times for efficient at harvesting water than a naturally-convecting MOF layer. In one example, FIG. 4 shows a residence with a MOF system 400 (such as one of the systems shown schematically in FIGS. 1-3) integrated into a standard window A/C unit 402, suspended in a window 404 of a residence 406. When the window A/C unit 402 is turned on, cold air blows into the residence 406 and exhaust is expelled. The exhaust directly flows onto the MOF layer(s) (10, 110, 210) inducing forced turbulent convection. In this example, roughly 3 L/day of water may be harvested.

The MOF system 400 of FIG. 4 can, in principal, be scaled up to large and larger buildings. For example, a small building 506A with multiple HVAC units 502A with MOF systems 500A attached thereto is shown in FIG. 5A. Generally speaking, small and large buildings employ industrial size HVAC units and not the window A/C unit 402 of FIG. 4.

Industrial size HVAC units may require an alternative method of integration of a MOF system to a residential A/C unit. For example, the manner in which the plenum 238 of FIG. 3 attaches to an A/C vent versus an industrial HVAC may be different.

In FIG. 5A, each industrial HVAC unit 502A has the equivalent cooling strength of 5 of the units 402. A small building may have one or several units 502A. Building 506A is disposed with two units, thus 10 times the exhaust expulsion of the residence 406. Therefore, in this example, the small building 5A could harvest 30 L/day of water. Scaling up even further to a city building 506B, as shown in FIG. 5B, can accommodate still more HVAC units 502B, thus increasing the water harvesting capability. In this example, the city building 506B has 10 times the number of HVAC units as the building 506A. 20 HVAC units 502B are disposed with MOF systems 500B in the same manner as the above example, with the capacity to harvest roughly 300 L/day of water. Additionally, the HVAC units 502A, 502B seat on top of the buildings 506A, 506B, respectively and can be exposed to sunlight. Direct sunlight can entirely, or at least partially, power the thermoelectric cooler 30, 130. Finally, since the HVAC units 502A, 502B are disposed on top of the buildings 506A, 506B, respectively, they can act as a pressure head, therefore not requiring a water pump.

As discussed above, the amount of water harvested by any MOF system depends on the relative humidity of the air that flows onto a MOF layer. Examples of water harvesting as a function of relative humidity have been empirically measured (e.g., H. Kim et al., Science, April 28; 356(633):430-434, 2017), and FIG. 6 shows approximations for the number of liters of water harvested per day on a y-axis 610 in units of log base 10 as a function of relative humidity in units of percent on an x-axis 612. A bottom solid curve 614 shows water collected over a day for the residence 406 with the air flowing on the MOF layer (or array of layers) at 25% relative humidity, climbing to 100% relative humidity. A middle solid curve 616 shows the same, but for the small building 506A, and a top solid curve 618 is for the city building 506B. In general, as the relative humidity of the air flowing against the MOF layer rises, the amount of water moisture received by the MOF layer in turn increases and more water is harvested.

While the foregoing description is with respect to specific examples, those skilled in the art will appreciate that there are numerous variations of the above that fall within the scope of the concepts described herein and the appended claims.

The invention claimed is:

1. A system for reclaiming water from moisture-laden building exhaust exiting a building through a vent, the system comprising:

one or more porous metal organic frameworks (MOFs) disposed downstream of the building exhaust vent, the MOFs each having an edge positioned for receiving the exiting moisture-laden building exhaust, the MOF adsorbing water from the exiting moisture-laden building exhaust via diffusion within the MOF;

cooling means for facilitating desorption of water from within the MOF, the cooling means being adjacent a surface of the MOF, the surface being different from the edge positioned for receiving the exiting moisture-laden building exhaust; and collection means for water obtained by desorption from within the MOF.

2. The system of claim 1, wherein the cooling means is a thermoelectric cooler.

3. The system of claim 2, further comprising a heat flux sensor for monitoring condensation heat within or adjacent to the MOF for purposes of adjusting the thermoelectric cooler.

4. The system of claim 1, wherein the collection means is a discharge pipe for directing water downstream of the MOF.

5. The system of claim 1, wherein the collection means comprises a vessel for containing the water.

6. The system of claim 1, wherein the area of the surface is larger than the area of the edge.

7. The system of claim 1, wherein the one or more porous MOFs comprises a plurality of porous MOFs.

8. The system of claim 7, wherein the plurality of porous MOFs are arranged in an array with the edges facing in the same direction.

9. The system of claim 8, wherein each of the plurality of porous MOFs includes an adjacent cooling means.

10. The system of claim 1, further comprising a plenum disposed between the building exhaust vent and the MOF.

11. The system of claim 10, wherein the plenum is configured to vary in volume in response to pressure changes within the plenum.

12. The system of claim 1, further comprising an agitator for agitating the MOF in order to facilitate water desorption.

13. The system of claim 1, wherein the MOF includes a second edge, opposite the edge positioned for receiving the exiting moisture-laden building exhaust, through which water resulting from desorption can exit the MOF.

14. A method of reclaiming water from moisture-laden building exhaust exiting a building through a vent using the system of claim 1, the method comprising:

adsorbing water within the one or more MOFs from the exiting moisture-laden building exhaust;

desorping water from within the one or more MOFs by cooling at least a portion of the MOF using the cooling means; and collecting water desorped from with the MOF using the collecting means.

15. The method of claim 14, further comprising agitating the one or more MOFs to facilitate desorping water from within the one or more MOFs.

* * * * *